(12) United States Patent
Moreno-Castañeda et al.

(10) Patent No.: US 8,787,048 B2
(45) Date of Patent: Jul. 22, 2014

(54) CONTROL METHODS FOR THE SYNCHRONISATION OF PARALLEL-CONNECTED POWER CONVERTERS OPERATING IN ACCORDANCE WITH A PULSE WIDTH MODULATION (PWM) STRATEGY

(75) Inventors: Veimar Yobany Moreno-Castañeda, Cheshire (GB); Chunmei Feng, Cheshire (GB); Jeremy Stephen Prevost Knight, Staffordshire (GB); Richard Stuart Webb, Staffordshire (GB)

(73) Assignee: GE Energy Power Conversion Technology Limited, Rugby, Warwickshire (GB)

( * ) Notice: Subject to any disclaimer, the term of this patent is extended or adjusted under 35 U.S.C. 154(b) by 166 days.

(21) Appl. No.: 13/380,532

(22) PCT Filed: Jun. 29, 2010

(86) PCT No.: PCT/EP2010/003845
§ 371 (c)(1),
(2), (4) Date: Mar. 6, 2012

(87) PCT Pub. No.: WO2011/000510
PCT Pub. Date: Jan. 6, 2011

(65) Prior Publication Data
US 2012/0155131 A1    Jun. 21, 2012

(30) Foreign Application Priority Data

Jul. 2, 2009  (EP) .................................. 09251712

(51) Int. Cl.
*H02M 7/00*    (2006.01)
(52) U.S. Cl.
USPC ................. 363/67; 363/68; 363/69; 363/70

(58) Field of Classification Search
USPC .......................... 363/67, 68, 69, 70
See application file for complete search history.

(56) References Cited

U.S. PATENT DOCUMENTS

| 4,802,079 | A |   | 1/1989  | Mizoguchi |
| 5,460,244 | A | * | 10/1995 | Tanahashi ..................... 187/293 |
| 5,657,217 | A |   | 8/1997  | Watanabe et al. |
| 5,757,634 | A |   | 5/1998  | Ferens |
| 7,327,588 | B2 |  | 2/2008  | Ollila |
| 8,374,011 | B2 | * | 2/2013 | Wirth ............................ 363/131 |

(Continued)

*Primary Examiner* — Bao Q Vu
(74) *Attorney, Agent, or Firm* — Parks IP Law LLC; Theodore A. Woods

(57) ABSTRACT

A method is described for controlling a plurality of parallel-connected power converters 20a, 20b, each of which operates in accordance with a pulse width modulation (PWM) strategy defined by an independent voltage carrier signal and an independently controllable modulating sinusoidal voltage signal which are used to generate a PWM command signal for each PWM strategy. The voltage carrier signals of the PWM strategies have the same switching period and desynchronisation of the PWM command signals causes an unwanted circulating current to flow between the power converters 20a, 20b. The method thus comprises providing the independently controllable modulating sinusoidal voltage signal of the PWM strategy of at least one of the plurality of power converters 20a, 20b with a dc voltage offset to modify the PWM command signal of the at least one power converter and thereby increase the synchronisation of the PWM command signals so that the magnitude of any unwanted circulating current is reduced. The typically determined based on the magnitude of the circulating current flowing between the parallel-connected power converters 20a, 20b.

18 Claims, 6 Drawing Sheets

(56) References Cited

U.S. PATENT DOCUMENTS

| | | | |
|---|---|---|---|
| 2001/0022736 A1* | 9/2001 | Suzuki | 363/69 |
| 2003/0137856 A1 | 7/2003 | Sheng et al. | |
| 2009/0109714 A1* | 4/2009 | Lou et al. | 363/69 |

* cited by examiner

CONTROL METHODS FOR THE SYNCHRONISATION OF PARALLEL-CONNECTED POWER CONVERTERS OPERATING IN ACCORDANCE WITH A PULSE WIDTH MODULATION (PWM) STRATEGY

FIELD OF THE INVENTION

The present invention relates generally to a method for controlling the synchronisation of a plurality of parallel-connected power converters. More particularly, embodiments of the present invention relate to methods for controlling the synchronisation of a plurality of parallel-connected power converters operating with a pulse width modulation (PWM) strategy and which can be used to interface generators providing variable voltage at variable frequency to a power grid or to a supply network at nominally fixed voltage and frequency. However, the methods can also be used for controlling the synchronisation of parallel-connected power converters operating with a PWM strategy that are used to interface a motor requiring variable voltage at variable frequency to a supply network (ac busbar) at nominally fixed voltage and frequency, for example. Further uses would include the synchronisation of power converters operating with a PWM strategy that are configured to provide static volt-ampere reactive (VAR) compensation.

BACKGROUND ART

With regard to the first of the potential uses mentioned above in which power converters are used in electricity generation applications, it is possible to convert wind energy into electrical energy by using a wind turbine to drive the rotor of a generator, either directly or indirectly by means of a gearbox. The ac frequency that is developed at the stator terminals of the generator (the "stator voltage") is directly proportional to the speed of rotation of the rotor. The voltage at the generator terminals also varies as a function of speed and, depending on the particular type of generator, on the flux level.

For optimum energy capture, the speed of rotation of the output shaft of the wind turbine will vary according to the speed of the wind driving the turbine blades. To limit the energy capture at high wind speeds, the speed of rotation of the output shaft is controlled by altering the pitch of the turbine blades. Connection of the variable voltage and frequency of the generator to the nominally fixed voltage and frequency of the supply network can be achieved by using suitably configured power converters.

A power converter in the form of a generator bridge, and typically operating as an active rectifier, is used to supply power from the generator to a dc link. The generator bridge can have any suitable topology with a series of semiconductor power switching devices fully controlled and regulated using a pulse width modulation (PWM) strategy.

The dc output voltage of the generator bridge is fed to the dc terminals of a power converter in the form of a network bridge and typically operating as an active inverter. The principal control for the dc link voltage is achieved by controlling the generator bridge, but other methods of controlling the dc link voltage are possible.

The ac output voltage of the network bridge is filtered and supplied to the nominally fixed frequency supply network via a step-up transformer. Protective switchgear can be included to provide a reliable connection to the supply network and to isolate the generator and converter system from the supply network for various operational and non-operational requirements.

With regard to the second of the potential uses mentioned above, power converters can also be used in motoring applications. In this case, a power converter in the form of a network bridge and typically operating as an active rectifier supplies power to a dc link. The dc output voltage of the network bridge is fed to the dc terminals of a power converter in the form of a machine bridge which typically operates as an active inverter. The ac output voltage of the machine bridge is finally supplied to a variable speed ac motor.

In some applications employing three-phase power supplies, such as those outlined above, an element of redundancy is required to ensure that a reliable source of power can be provided. The required redundancy can be achieved by connecting several power converters in parallel. It can also be desirable to connect several power converters in parallel in applications where high power and/or high performance is/are required.

FIG. 1 is a schematic drawing showing part of a power conversion system in which two power converters 10, 12 are connected in parallel. The ac terminals of both power converters 10, 12 are connected to an ac electrical machine 14, which may be a generator or a motor, whilst the dc terminals of both power converters 10, 12 are connected to a dc link 16.

In the event that there is any desynchronisation between the PWM command signals of the PWM strategies of the parallel-connected power converters 10, 12, it is possible for a circulating current (denoted $i_{circ}$) to flow around the loop formed by the power converters 10, 12. The circulating current is not limited to the three-phase supply frequency and can possess both ac and dc components. The presence of a circulating current is undesirable because it does not process useful power and places extra stress on the power converters 10, 12. The circulating current can, in fact, be destructive if it is allowed to become excessively large.

A number of techniques for reducing or eliminating circulating current in parallel-connected power converters have been proposed, but all of the known techniques have certain shortcomings.

In one known technique, illustrated in FIG. 2, an isolation transformer 18 is installed in the three-phase supply path of all but one of the power converters 10, 12. The isolation transformer 18 electrically separates the input circuits, whilst allowing the transmission of ac signal/power, and thus prevents any unwanted circulating current from flowing between the parallel-connected power converters 10, 12. Isolation transformers are, however, very expensive and take up a large amount of space and because of this are far from being an ideal solution.

An alternative technique involves the use of a common modulator to generate a common PWM modulating sinusoidal voltage signal for the PWM strategies of all of the power converters. The common modulating sinusoidal voltage signal is fed to each of the plurality of parallel-connected power converters to maintain the synchronisation between the power converters. In one implementation of this technique, described in U.S. Pat. No. 5,657,217, the on/off commands for the switching devices of each of a plurality of parallel-connected power converters are provided by a spatial voltage vector calculator, which selects multiple spatial voltage vectors, and a vector permutation device, which determines two sets of the order of generation of the selected multiple spatial voltage vectors.

The use of a common modulator does not, however, provide any system redundancy and in the event of failure of the common modulator, all of the parallel-connected power converters will cease functioning.

In another technique, a synchronising signal source can be used to generate a square wave that is coupled to each power converter. The modulator of each power converter uses the synchronising signal to synchronise the phase angle of the output signal with the output signals of the other power converters. Examples of different implementations of this technique are described in U.S. Pat. Nos. 5,436,823 and 4,802,079. The implementation described in U.S. Pat. No. 4,802,079 suffers from the particular drawback that it can only be used with two parallel-connected power converters.

The synchronising signal technique, like the common modulator technique outlined above, does not provide any system redundancy and, in the event of failure of the device generating the synchronising signal, it will not be possible to maintain the synchronisation of the parallel-connected power converters.

Another known technique is the so-called 'master/slave' technique. In this technique, one of a plurality of parallel-connected power converters is designated as the 'master' power converter and this master power converter sends a synchronising signal to all of the other power converters which are designated as 'slave' power converters. The phase angle of the triangular voltage carrier signal or the modulating sinusoidal voltage signal of the PWM strategy of each of the slave power converters is modified to achieve synchronisation of the power converters. If interchange capability is provided so that any of the power converters can assume the role of the master power converter or slave power converters, as described in U.S. Pat. No. 5,757,634, the system can continue to operate in synchronisation in the event of failure of one or more of the power converters. However, a drawback of the 'master/slave' technique is that a communication link is needed between the power converters, thus increasing the complexity of the power conversion system.

U.S. Pat. No. 7,327,588 B2 describes a method for synchronising a plurality of parallel-connected power converters operating as inverter units. Each inverter unit is provided with an inverter-specific modulator, thus avoiding the need for a communication link between the inverter units. Synchronisation is achieved at each modulator by stepping up or down the frequency of a triangular voltage carrier wave based on the circulating current measured at the peak of the triangular carrier wave. Although synchronisation can be achieved using this method, the frequency changes of the triangular carrier wave result in a change in the switching period and this leads to unwanted effects such as a variable set of harmonic components in the output voltage.

There is, therefore, a need for an improved method for controlling the synchronisation of a plurality of parallel-connected power converters which avoids the drawbacks associated with known techniques. In particular, there is a need for an improved method which avoids the need for both a communication link between power converters and a change in the switching period of the PWM voltage carrier signals of individual power converters.

SUMMARY OF THE INVENTION

According to a first aspect of the present invention, there is provided a method for controlling a plurality of parallel-connected power converters, each of which operates in accordance with a pulse width modulation (PWM) strategy defined by an independent voltage carrier signal and an independently controllable modulating sinusoidal voltage signal which are used to generate a PWM command signal for each PWM strategy, wherein the voltage carrier signals of the PWM strategies have the same switching period and wherein desynchronisation of the PWM command signals causes an unwanted circulating current to flow between the power converters, the method comprising the step of providing the independently controllable modulating sinusoidal voltage signal of the PWM strategy of at least one of the plurality of power converters with a dc voltage offset to modify the PWM command signal of the at least one power converter and thereby increase the synchronisation of the PWM command signals so that the magnitude of any unwanted circulating current is reduced.

The method enables the PWM strategies, and specifically the PWM command signals, of a plurality of power converters connected in parallel to be synchronised thereby reducing, and in some cases totally eliminating (in the case of full synchronisation of the PWM command signals), unwanted circulating current.

Redundancy of a plurality of power converters operating in accordance with such a method is obtained by virtue of the fact that the modulating sinusoidal voltage signal of the PWM strategy of each of the plurality of power converters is independently controllable. The power converters can, thus, continue to operate in synchronisation even in the event of failure of one or several of the plurality of power converters.

Because there is no reliance upon an external modulating sinusoidal voltage signal or synchronising signal, there is no need for a communication link between the individual power converters, thus reducing the complexity of the power conversion system and again contributing to system redundancy.

Furthermore, due to the fact that the PWM strategies, and specifically the voltage carrier signals, of the plurality of power converters operating in accordance with such a method have the same switching period, unwanted harmonic components in the output voltage are advantageously avoided.

A plurality of parallel-connected power converters operating in accordance with the above method may be located between an ac electrical machine and a dc link. When the ac electrical machine is a generator, the plurality of parallel-connected power converters act as generator bridges and typically operate as active rectifiers to supply power to the dc link. On the other hand, when the ac electrical machine is a variable speed ac motor, the plurality of parallel-connected power converters act as motor bridges and typically operate as active inverters to supply power to the ac motor.

A plurality of parallel-connected power converters operating in accordance with the above method may alternatively or additionally be located between a dc link and supply network. When the plurality of parallel-connected power converters are used in generating applications, the power converters act as network bridges and typically operate as active inverters to supply power to the supply network. When the plurality of parallel-connected power converters are used in motoring applications, the power converters act as network bridges and typically operate as active rectifiers to supply power to the dc link.

Each PWM command signal may comprise a series of pulses each having a pulse rising edge time, a pulse falling edge time and a pulse duration. Modification of the PWM command signal, by providing the modulating sinusoidal voltage with a dc voltage offset, may result in modification of the pulse rising edge time of each of the series of pulses and also typically of the pulse falling edge time, with the pulse duration being unaffected. In some embodiments, modification of the PWM command signal as aforesaid may result in modification of the pulse duration in addition to modification of one or both of the pulse rising edge time and the pulse falling edge time, thus resulting in modification of the duty cycle of the PWM command signal.

The method may comprise the step of providing the independently controllable modulating sinusoidal voltage signal of the PWM strategy of all but one of the power converters with a dc voltage offset. This enables the PWM command signals of all but one of the power converters to be modified, which is sufficient to achieve synchronisation of all of the power converters and thereby reduce the magnitude of any unwanted circulating current. The method may comprise the step of providing the independently controllable modulating sinusoidal voltage signal of the PWM strategy of different power converters with a dc voltage offset of a different magnitude.

The PWM command signal for the PWM strategy of each power converter may be generated by comparing each independent common voltage carrier signal with the respective independently controllable modulating sinusoidal voltage signal.

The PWM strategy of each power converter is typically a three-phase PWM strategy employing three of said independently controllable modulating sinusoidal voltage signals, one for each phase. If the switching period of the PWM strategy, in other words of the voltage carrier signal, of each power converter is equivalent to 360°, each of said independently controllable modulating sinusoidal voltage signals is typically phase shifted by 120°.

Each of the independently controllable modulating sinusoidal voltage signals may be used to generate, in conjunction with the independent voltage carrier signal of each power converter, a PWM command signal for each respective phase. The method may, thus, further comprise providing each of said three independently controllable modulating sinusoidal voltage signals of at least one, and possibly several, of the plurality of power converters with the same dc voltage offset to simultaneously modify the PWM command signal for each respective phase.

The independently controllable modulating sinusoidal voltage signal of the PWM strategy of at least one, and possible several, of the power converters may be provided with a negative dc voltage offset whilst the independently controllable modulating sinusoidal voltage of at least one, and possibly several, of the remaining power converters may be provided with a positive dc voltage offset. The advantage of providing both negative and positive dc voltage offsets is that the magnitude of the particular dc voltage offsets that are required to achieve optimum synchronisation of the PWM command signals of the PWM strategies of different power converters may be lower than if only one or more negative or one or more positive dc voltage offsets are provided.

The method may comprise determining the magnitude of the circulating current flowing between the plurality of power converters and may comprise deriving the magnitude of the dc voltage offset that is needed to increase the synchronisation of the power converters, and specifically the PWM command signals, from the determined magnitude of the circulating current.

The method may comprise continuously determining the magnitude of the circulating current flowing between the plurality of power converters. The method may also comprise continuously deriving the magnitude of the dc voltage offset that is needed to increase the synchronisation of the power converters, and specifically the PWM command signals, and reduce the magnitude of the circulating current. Embodiments of the method thus employ closed-loop feedback control and operate in real-time to continuously optimise the synchronisation of the plurality of parallel-connected power converters.

The magnitude of the circulating current may be determined by measuring the three-phase line currents on the output side of one or more of the plurality of power converters.

The step of determining the magnitude of the circulating current may include summing the measured three-phase line currents on the output side of one or more of the plurality of power converters and may include multiplying the summed three-phase line currents by one third.

The abovementioned closed-loop feedback control may be achieved by using one or more proportional-integral-derivative (PID) controllers. In particular, the magnitude of the required dc voltage offset may be derived using a proportional-integral-derivative (PID) controller in which the proportional and derivative terms may both be preceded by a low pass filter (LPF). Each PWM converter may be provided with a PID controller.

The method may comprise determining an error signal for input into the or each PID controller based on the determined magnitude of the circulating current. The use of a low pass filter as aforesaid may be advantageous since it may prevent the or each PID controller from over reacting to high frequency components in the or each respective error signal.

According to a second aspect of the present invention, there is provided a plurality of parallel-connected power converters, each of which operates in accordance with a pulse width modulation (PWM) strategy defined by an independent voltage carrier signal and an independently controllable modulating sinusoidal voltage signal which are used to generate a PWM command signal for each PWM strategy, wherein the voltage carrier signals of the PWM strategies have the same switching period and wherein desynchronisation of the PWM command signals causes an unwanted circulating current to flow between the power converters, at least one of the plurality of power converters including a controller, wherein the controller is selectively operable to provide the independently controllable modulating sinusoidal voltage signal of the PWM strategy of the at least one power converter with a dc voltage offset to modify the PWM command signal of the at least one power converter and thereby increase the synchronisation of the PWM command signals so that the magnitude of any unwanted circulating current is reduced.

In some embodiments, all but one of the power converters may include one of said controllers and each controller may be independently selectively operable to provide the independently controllable modulating sinusoidal voltage signal of its respective PWM strategy with a dc voltage offset, thus enabling the PWM command signals of the PWM strategies of all but one of the power converters to be independently and selectively modified. Such an arrangement provides a power conversion system employing the plurality of parallel-connected power converters with adequate system redundancy and synchronisation capability by enabling the PWM command signals of all but one of the power converters to be modified.

In other embodiments, each of the plurality of power converters may include one of said controllers and each controller may be independently selectively operable to provide the independently controllable modulating sinusoidal voltage signal of its respective PWM strategy with a dc voltage offset, thus enabling the PWM command signals of the PWM strategies of all of the power converters to be independently and selectively varied. Such an arrangement provides a power conversion system employing the plurality of parallel-connected power converters with maximum system redundancy.

Each power converter may include a modulator which may be independently operable to generate the independently controllable modulating sinusoidal voltage signal and which may be operable to generate the independent voltage carrier signal for its respective PWM strategy.

Each modulator may be operable to generate the PWM command signal for the PWM strategy of its associated power converter by comparing each independent common voltage carrier signal with each respective independently controllable modulating sinusoidal voltage signal.

As indicated above, the PWM strategy of each power converter may typically be a three-phase PWM strategy. Each modulator may thus be operable to generate three of said independently controllable modulating sinusoidal voltage signals which may be used to generate, in conjunction with the independent voltage carrier signal of each power converter, a PWM command signal for each respective phase. Each controller may thus be selectively operable to provide each of said three generated independently controllable modulating sinusoidal voltage signals with the same dc voltage offset to simultaneously modify the PWM command signal of each respective phase.

One or more of the controllers may be operable to provide the independently controllable modulating sinusoidal voltage signal of the PWM strategy of its associated power converter with a negative dc voltage offset whilst one or more of the remaining controllers may be operable to provide the independently controllable modulating sinusoidal voltage signal of the PWM strategy of its associated power converter with a positive dc voltage offset. This may facilitate modification, and hence synchronisation, of the PWM command signals, as already explained above.

The or each controller may be operable to determine the magnitude of the circulating current flowing between the plurality of power converters and may be operable to derive the magnitude of the dc voltage offset that is needed to increase the synchronisation of the PWM command signals, and hence the PWM strategies of the power converters, from the determined magnitude of the circulating current.

The or each controller may be operable to continuously determine the magnitude of the circulating current flowing between the plurality of power converters. The or each controller may be operable to continuously determine the magnitude of the dc voltage offset that is needed to increase the synchronisation of the PWM command signals, and hence the PWM strategies of the power converters, and thereby reduce the magnitude of the circulating current. Feedback control may thus be employed to optimise the synchronisation of the plurality of parallel-connected power converters, in real-time.

The or each controller may be operable to measure the three-phase line currents on the output side of one or more of the plurality of power converters to thereby determine the magnitude of the circulating current.

The or each controller may be operable to determine the magnitude of the circulating current by summing the measured three-phase line currents on the output side of one or more of the plurality of power converters and possibly by multiplying the summed three-phase line currents by one third.

The or each controller may comprise a proportional-integral-derivative (PID) controller which may be operable to determine the magnitude of the required dc voltage offset. The proportional and derivative terms of the PID controller may both be preceded by a low pass filter (LPF).

An error signal for input into the PID controller may be based on the determined magnitude of the circulating current.

Each power converter is typically a current-bidirectional power converter. The power converters can be used for both motoring and generating applications. For example, the power converters can be used to interface a generator to a supply network or power grid. The power converters can also be used to interface a motor to a supply network (as busbar). Alternatively, each power converter can operate as a static volt-ampere reactive (VAR) compensator. As explained above, the plurality of parallel connected power converters may be located between an ac electrical machine and a dc link, acting either as generator bridges or motor bridges. The plurality of parallel-connected power converters may alternatively or additionally be located between a dc link and a supply network, operating as network bridges.

DRAWINGS

DETAILED DESCRIPTION OF EMBODIMENTS
OF THE INVENTION

Embodiments of the present invention will now be described by way of example only and with reference to the accompanying drawings.

Figure 1:
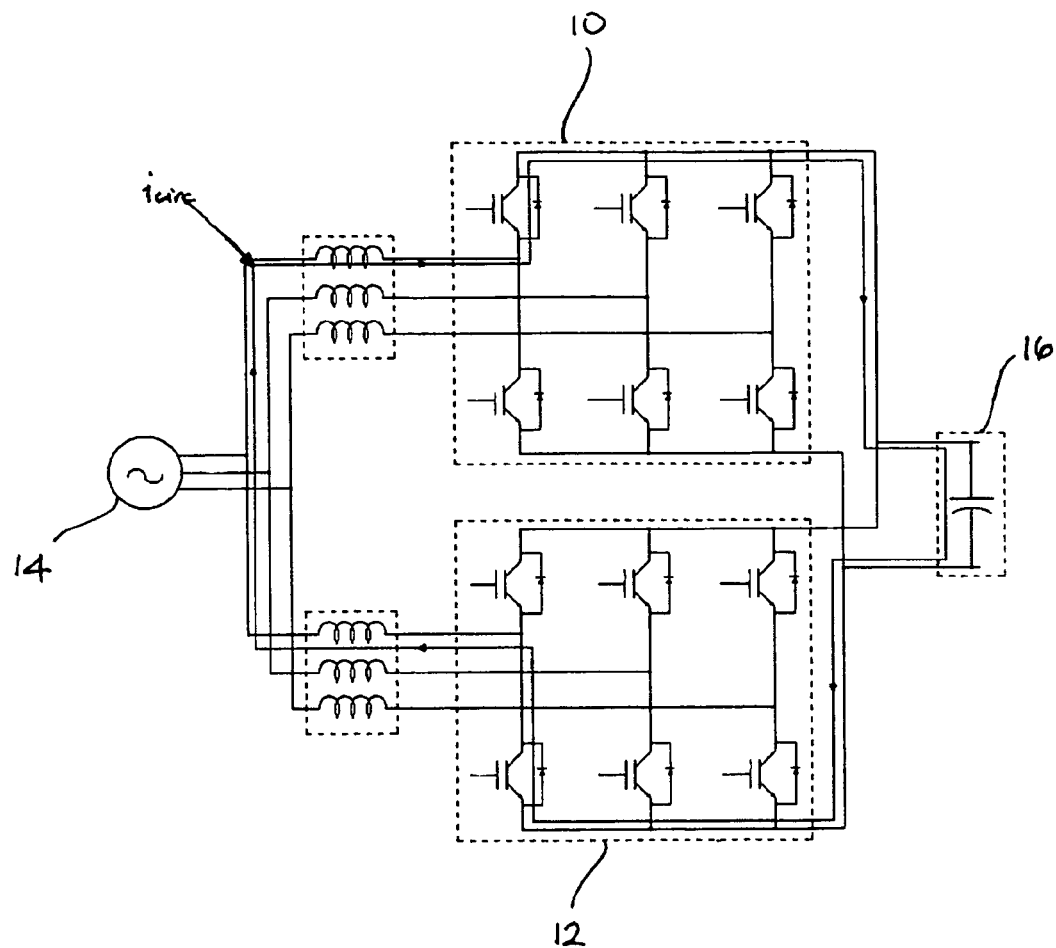
FIG. 1 is a schematic illustration of part of a known power conversion system showing an unwanted circulating current flowing between two parallel-connected power converters.
Figure 2:
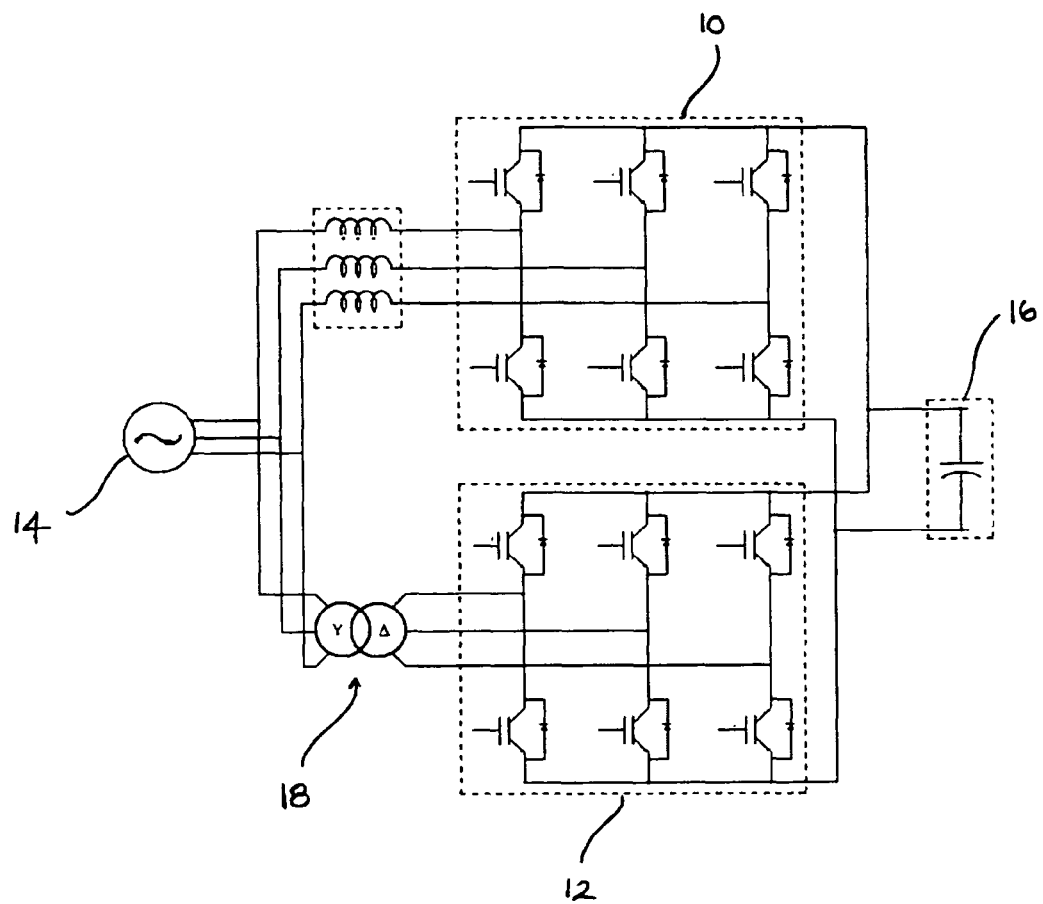
FIG. 2 is a schematic illustration of the power conversion system of FIG. 1 with an isolation transformer being used to eliminate the circulating current.
Figure 3:
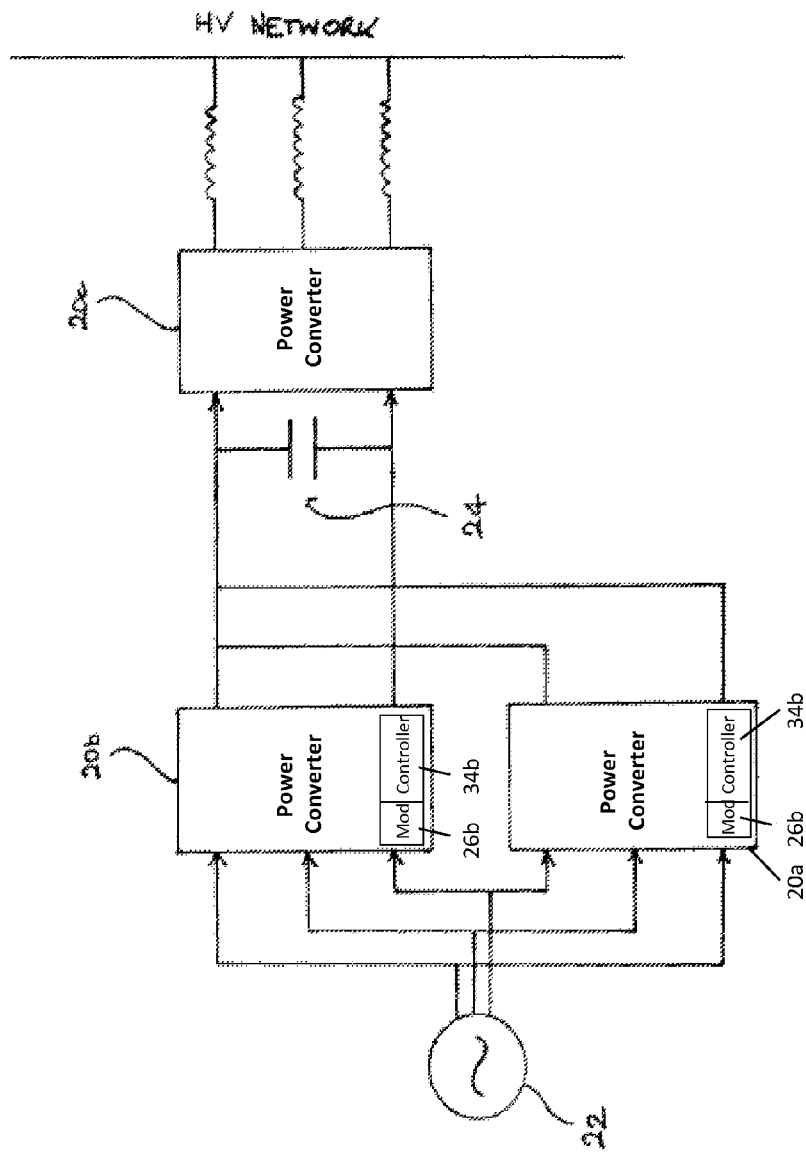
FIG. 3 is a schematic illustration of a plurality of parallel-connected power converters in accordance with embodiments of the present invention that can be used to interface between a three phase motor or generator and a power network.

FIG. 3 illustrates two parallel-connected power converters 20a, 20b which are used to interface between a variable speed ac induction generator 22, for example driven by a wind turbine, and a shared supply network (labelled HV NETWORK). Although only two power converters 20a, 20b are illustrated, it will be appreciated that any number of parallel-connected power converters may be provided and that this may depend, amongst other things, on the total power requirement.

The ac terminals of the induction generator 22 are connected to the ac terminals of each of the power converters 20a, 20b which together supply power to a common dc link 24, and each power converter 20a, 20b thus operates as an active rectifier. Each power converter 20a, 20b has a conventional three-phase two-level topology with a series of semiconductor power switching devices fully controlled and regulated using a PWM strategy. However, in practice the power converters 20a, 20b can have any suitable topology such as a three-level neutral point clamped topology or a multi-level topology (Foch-Maynard arrangement, for example).

The dc output voltage of each power converter 20a, 20b is fed to the dc terminals of a power converter 20c which operates as an active inverter and which supplies ac power to the shared supply network. The power converter 20c has a similar three-phase two level topology to the power converters 20a, 20b with a series of semiconductor power switching devices fully controlled and regulated using a PWM switching strategy. However, in practice the power converter 20c can have any suitable topology, as discussed above for the power converters 20a, 20b.

Each power converter 20a, 20b includes a modulator 26a, 26b and each modulator 26a, 26b generates a sinusoidal PWM strategy for its respective power converter 20a, 20b. Each modulator 26a, 26b operates independently and there is no communication link between the modulators 26a, 26b and, hence, between the individual parallel-connected power converters 20a, 20b.

Figure 4:
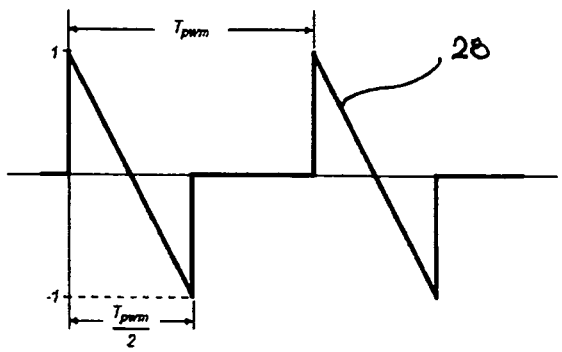
FIG. 4 is schematic illustration of a voltage carrier signal that forms part of a sinusoidal PWM strategy for a power converter.
Figure 5:
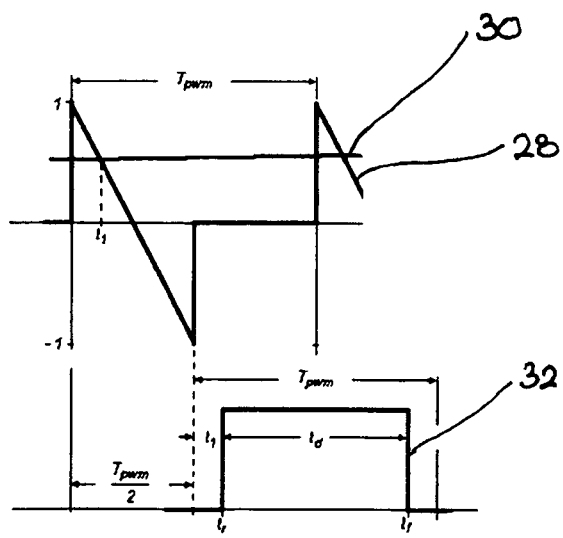
FIG. 5 is a schematic illustration of part of a sinusoidal PWM strategy for a power converter that is generated using the voltage carrier signal illustrated in FIG. 4.

FIGS. 4 and 5 illustrate schematically the generation of the sinusoidal PWM strategy for one of the three phases of the power converter 20a by its associated modulator 26a. The modulator 26a generates an independent voltage carrier signal 28 which has a predetermined switching period $T_{pwm}$. The modulator 26a also generates three independently controllable modulating sinusoidal voltage signals with only one modulating sinusoidal voltage signal 30, corresponding to one of the three phases, being shown in FIG. 5.

In practice, the two further independently controllable modulating sinusoidal voltage signals generated by the modulator 26a would have the same characteristics as the independently controllable modulating sinusoidal voltage signal 30 but would be phase shifted from it. Typically, where the switching period $T_{pwm}$ of the voltage carrier signal 28 is equivalent to 360°, each of the two further independent modulating sinusoidal voltage signals would be phase shifted by 120° and 240°, respectively.

The modulator 26a generates a PWM command signal for each phase of the power converter by comparing each of the three independently controllable modulating sinusoidal voltage signals with the voltage carrier signal 28, and a PWM command signal 32 for one of the phases, which is generated by comparing the independent voltage carrier signal 28 with the independently controllable modulating sinusoidal voltage signal 30, is illustrated in FIG. 5.

In the illustrated embodiment, the modulator 26a generates the PWM command signal 32 using the following strategy. Firstly, the voltage carrier signal 28 is compared with the modulating sinusoidal voltage signal 30 to define the pulse rising edge time $t_r$ using the following equation:

$$t_r = \frac{T_{pwm}}{2} + t_1 \quad \text{(Equation 1)}$$

The pulse duration $t_d$ is then determined using the following equation:—

$$t_d = T_{pwm} - 2*t_1 \quad \text{(Equation 2)}$$

Finally, the pulse falling edge time $t_f$ is determined as follows:—

$$t_f = t_r + t_d \quad \text{(Equation 3)}$$

The modulator 26a uses the same strategy to generate the PWM command signals for the other two phases, by comparing the respective independently controllable modulating sinusoidal voltage signals for each phase with the same voltage carrier signal 28. Moreover, each of the modulators 26a, 26b operates in exactly the same manner to generate the PWM strategy for its associated power converter 20a, 20b. In accordance with the invention, the switching period $T_{pwm}$ of the voltage carrier signal generated by each modulator 26a, 26b is the same and the PWM strategy of each of the parallel-connected power converter 20a, 20b thus has the same switching period. Unwanted harmonic components in the output voltage are, thus, advantageously avoided.

Figure 6:
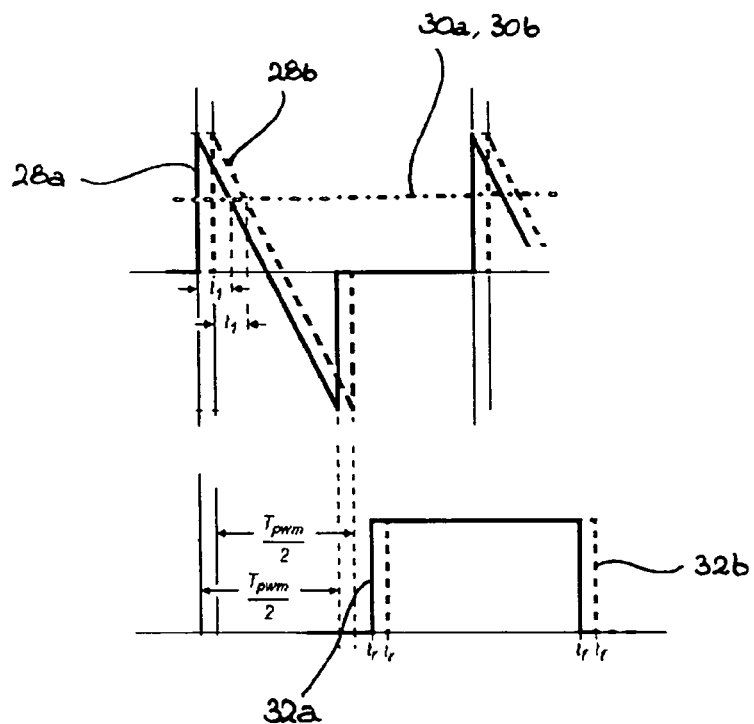
FIG. 6 is a schematic illustration showing desynchronisation of the PWM command signals of the PWM strategies of two parallel-connected power converters which causes an unwanted circulating current.

It is possible for an unwanted circulating current to flow between the two parallel-connected power converters 20a, 20b if the switches of the same phase in the power converters 20a, 20b are not activated simultaneously. Referring to FIG. 6, which illustrates schematically the generation of the PWM command signals 32a, 32b for the same phase of the two power converters 20a, 20b using identical but independently controllable modulating sinusoidal voltage signals 30a, 30b (which are shown as a single line due to the fact that they are identical), there is a phase shift of the voltage carrier signals 28a, 28b, due to the fact that the modulators 26a, 26b operate independently, and hence a phase shift of the PWM command signals 32a, 32b. It is this phase shift, or desynchronisation, of the PWM command signals that causes activation of the switches to become desynchronised and, hence, an unwanted circulating current to flow between the power converters 20a, 20b.

Because there is phase shifting of the voltage carrier signals 28a, 28b, the time $t_1$, defined by comparing the voltage carrier signals 28a, 28b with the independent modulating sinusoidal voltage signals 30a, 30b, differs for each of the power converters 20a, 20b and there is a consequent phase shifting of the resultant PWM command signals 32a, 32b that are independently generated by each modulator 26a, 26b and determined in accordance with the strategy outlined above.

In accordance with aspects of the present invention, the independently controllable modulating sinusoidal voltage signals 30a, 30b generated by the modulators 26a, 26b of one or more of the parallel-connected power converters 20a, 20b are provided with a dc voltage offset. As will be explained in detail below, this enables the PWM command signals 32a, 32b to be modified in such a way that any phase shift in the PWM command signals 32a, 32b, resulting from an unwanted phase shift in the independent voltage carrier signals 28a, 28b, can be reduced or eliminated, thereby reducing the magnitude of the unwanted circulating current or totally eliminating the unwanted circulating current.

Figure 7:
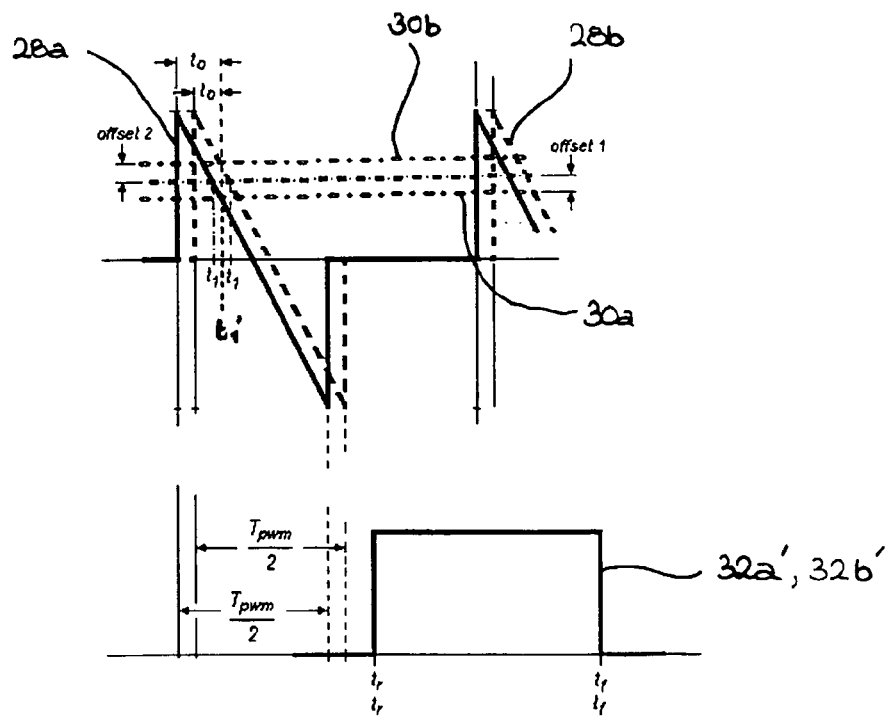
FIG. 7 is a schematic illustration showing how an offset applied to each of the independently controllable modulating sinusoidal voltage signals illustrated in FIG. 6 can be used to synchronise the PWM command signals.

In order to eliminate the phase shift between the PWM command signals of the power converters 20a, 20b, it will be appreciated that the time $t_1$, which as explained above is defined by comparing the respective voltage carrier signals 28a, 28b with the independently controllable modulating sinusoidal voltage signals 30a, 30b, needs to be the same for the PWM strategy of each parallel-connected power converter 20a, 20b. Referring to FIG. 7, the time $t_1$ for the PWM strategy of each power converter 20a, 20b is varied by adding a dc voltage offset to the independently controllable modulating sinusoidal voltage signal 30a, 30b of each PWM strategy, until a common time (denoted as time $t_1'$ in FIG. 7) is obtained for each PWM strategy.

In the embodiment illustrated in FIG. 7, it will be seen that the independently controllable modulating sinusoidal voltage signals 30a, 30b of the PWM strategies of both power converters 20a, 20b have been provided with a dc voltage offset.

Specifically, the independently controllable modulating sinusoidal voltage signal 30a of the PWM strategy of the power converter 20a has been provided with a negative dc voltage offset (offset 1) and the independently controllable modulating sinusoidal voltage signal 30b of the PWM strategy of the power converter 20b has been provided with a positive dc voltage offset (offset 2).

It is entirely within the scope of the invention that only one of the modulating sinusoidal voltage signals 30a, 30b could be provided with a suitable dc voltage offset, either positive or negative as needed. However, if only one of the modulating sinusoidal voltage signals 30a, 30b was provided with a dc voltage offset, the magnitude of the offset needed to obtain a common time $t_1'$ for each PWM strategy would be greater than the magnitude of individual and opposing dc voltage offsets that might otherwise need to be applied to each of the independently controllable modulating sinusoidal voltage signals 30a, 30b.

Following the application of suitable dc voltage offsets to the independently controllable modulating sinusoidal voltage signals 30a, 30b of the PWM strategies of the power converters 20a, 20b to achieve a common time $t_1'$, an offset time $t_o$ is determined for the PWM strategy of each power converter 20a, 20b by its associated modulator 26a, 26b, as illustrated in FIG. 7. The offset time $t_o$ can be determined using the following equation:—

$$t_o = t_1 - \frac{T_{pwn}}{4} * \text{offset} \quad \text{(Equation 4)}$$

where offset is the dc voltage offset applied to the modulating sinusoidal voltage signal of the PWM strategy of the power converter.

Following determination of the offset time $t_o$, each modulator 26a, 26b generates a modified PWM command signal 32a', 32b' for the PWM strategy of each power converter 20a, 20b. More particularly, each modulator 26a, 26b determines the pulse rising edge time $t_r$ for the modified PWM command signal 32a', 32b' of each PWM strategy as follows:—

$$t_r = \frac{T_{pwn}}{2} + t_o \quad \text{(Equation 5)}$$

Whilst it will be appreciated from FIG. 7 that the voltage carrier signals 28a, 28b of the PWM strategies of the power converters 20a, 20b remain phase shifted, it is apparent that the application of dc voltage offsets to the independently controllable modulating sinusoidal voltage signals 30a, 30b of the PWM strategies of the power converters 20a, 20b has resulted in the generation of modified PWM command signals 32a', 32b' that are fully synchronised. The modified PWM command signals 32a', 32b' are, in fact, shown in FIG. 7 as a single line due to the fact that they overlap as a result of their synchronisation. In the light of this, no circulating current will flow between the parallel-connected power converters 20a, 20b.

In some embodiments, each of the parallel-connected power converters 20a, 20b includes an independent controller 34a, 34b which is operable to determine the dc voltage offset that needs to be applied to the modulating sinusoidal voltage signals 30a, 30b to modify the PWM command signals 32a, 32b so that their synchronisation is increased and the magnitude of any unwanted circulating current is reduced. Each controller 34a, 34b determines, in real-time, the magnitude of any circulating current flowing between the power converters 20a, 20b and derives the magnitude of the required dc voltage offset based on the determined magnitude of the circulating current.

Figure 8:
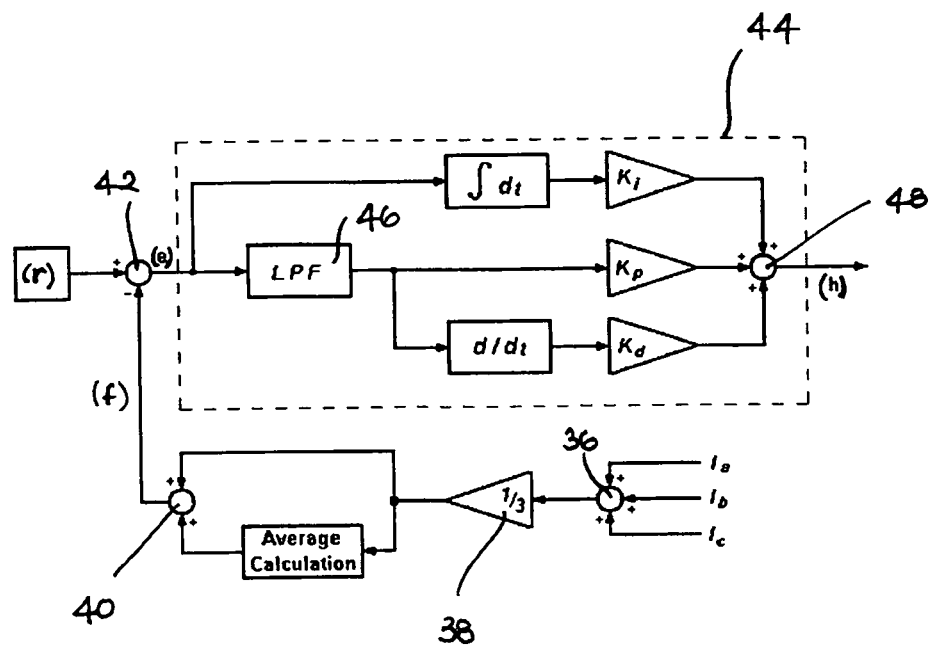
FIG. 8 is a schematic illustration of one embodiment of a controller for use with the plurality of parallel-connected power converters illustrated in FIG. 3.

Each controller 34a, 34b is typically configured to reduce the magnitude of the circulating current flowing between the parallel-connected power converters 20a, 20b by measuring the three-phase line currents on the output side of its associated power converter 20a, 20b. In particular and referring to FIG. 8 which shows one possible implementation for each controller 34a, 34b, in order to increase the synchronisation of the PWM command signals 32a, 32b of the PWM strategies of the parallel-connected power converters 20a, 20b, each controller 34a, 34b may determine the magnitude of the circulating current by summing 36 the measured three-phase line currents, denoted $I_a$, $I_b$, $I_c$, on the output side of its associated power converter 20a, 20b, and by multiplying 38 the summed three-phase line currents by one third. The average value of the circulating current is then added 40 to the circulating current value determined at 38 to provide a feedback signal (f). The feedback signal (f) is then subtracted 42 from a constant reference value (r) to provide an error signal (e). If total elimination of the circulating current is desired, the reference value (r) is set at zero. However, a different value can be selected if desired.

In one possible implementation, each controller 34a, 34b includes a proportional-integral-derivative (PID) feedback controller 44 which continuously determines the magnitude of the dc voltage offset (h) that is needed to eliminate the circulating current based on the error signal (e) which is itself determined based on the instantaneously determined magnitude of the circulating current, as described above. Generally, both the proportional and derivative terms of the PID controller 44 are preceded by a low pass filter (LPF) 46 to ensure that the PID controller 44 does not overreact to high frequency components in the input error signal (e). The outputs of each of the PID terms are summed 48 by the PID controller 44 to generate an appropriate dc voltage offset (h) to be applied to the modulating sinusoidal voltage signal 30a, 30b of the PWM strategy of its associated power converter 20a, 20b.

Although embodiments of the invention have been described in the preceding paragraphs with reference to various examples, it should be understood that various modifications may be made to those examples without departing from the scope of the present invention, as claimed.

Although only one power converter 20c is described and illustrated in FIG. 3 between the dc link 24 and the supply network, a plurality of power converters connected in parallel could be provided between the dc link 24 and the shared supply network. Such parallel-connected power converters, if provided, would operate in accordance with the principles described above with respect to the parallel-connected power converters 20a, 20b and would, thus, each include a respective modulator and controller. If such parallel-connected power converters were provided between the dc link 24 and the supply network, they could be used in conjunction with the parallel-connected power converters 20a, 20b or in conjunction with a single power converter between the generator 22 and the dc link 24.

Although the invention has been described above with respect to two parallel-connected power converters 20a, 20b, its principles are applicable to any number of power converters that are connected in parallel. The complexity of a power conversion system operating in accordance with the principles of the invention does not increase unduly as the number of parallel-connected power converters increases, and embodiments of the invention thus provide both a practical and cost-effective solution to the problem of eliminating circulating current.

The parallel-connected power converters 20a, 20b are equally suitable for use in motoring applications as they are in the generating application described above. For example, the power converters can be used to interface a motor to a supply network (ac busbar). The parallel-connected power converters 20a, 20b can also operate as static volt-ampere reactive (VAR) compensators.

The invention claimed is:

1. A method for controlling a plurality of parallel-connected power converters, each of which operates in accordance with a pulse width modulation (PWM) strategy defined by an independent voltage carrier signal and an independently controllable modulating sinusoidal voltage signal which are used to generate a PWM command signal for each PWM strategy, wherein the voltage carrier signals of the PWM strategies have the same switching period and wherein desynchronisation of the PWM command signals causes an unwanted circulating current to flow between the power converters, the method comprising the step of providing the independently controllable modulating sinusoidal voltage signal of the PWM strategy of at least one of the plurality of power converters with a dc voltage offset to modify the PWM command signal of the at least one power converter and thereby increase the synchronisation of the PWM command signals so that the magnitude of any unwanted circulating current is reduced.

2. The method of claim 1, wherein the PWM command signal for the PWM strategy of each power converter is generated by comparing each independent common voltage carrier signal with each respective independently controllable modulating sinusoidal voltage signal.

3. The method of claim 1, wherein the PWM strategy of each power converter is a three-phase PWM strategy employing three of said independently controllable modulating sinusoidal voltage signals which are used to generate, in conjunction with the independent voltage carrier signal of each power converter, a PWM command signal for each respective phase, the method further comprising providing each of said three independently controllable modulating sinusoidal voltage signals of at least one of the plurality of power converters with the same dc voltage offset to simultaneously modify the PWM command signal for each respective phase.

4. The method of claim 1, wherein the independently controllable modulating sinusoidal voltage signal of the PWM strategy of at least one of the power converters is provided with a negative dc voltage offset whilst the independently controllable modulating sinusoidal voltage of at least one of the remaining power converters is provided with a positive dc voltage offset.

5. The method of claim 1, wherein the method comprises determining the magnitude of the circulating current flowing between the plurality of power converters and deriving the magnitude of the required dc voltage offset from the determined magnitude of the circulating current.

6. The method of claim 5, wherein the magnitude of the circulating current is determined by measuring the three-phase line currents on the output side of one or more of the plurality of power converters.

7. The method of claim 6, wherein the step of determining the magnitude of the circulating current includes summing the measured three-phase line currents on the output side of one or more of the plurality of power converters and multiplying the summed three-phase line currents by one third.

8. The method of claim 5, wherein the magnitude of the required dc voltage offset is derived using a proportional-integral-derivative (PID) controller in which the proportional and derivative terms are both preceded by a low pass filter (LPF).

9. The method of claim 8, wherein the method comprises determining an error signal for input into the PID controller based on the determined magnitude of the circulating current.

10. A plurality of parallel-connected power converters, each of which operates in accordance with a pulse width modulation (PWM) strategy defined by an independent voltage carrier signal and an independently controllable modulating sinusoidal voltage signal which are used to generate a PWM command signal for each PWM strategy, wherein the voltage carrier signals of the PWM strategies have the same switching period and wherein desynchronisation of the PWM command signals causes an unwanted circulating current to flow between the power converters, at least one of the plurality of power converters including a controller, wherein the controller is selectively operable to provide the independently controllable modulating sinusoidal voltage signal of the PWM strategy of the at least one power converter with a dc voltage offset to modify the PWM command signal of the at least one power converter and thereby increase the synchronisation of the PWM command signals so that the magnitude of any unwanted circulating current is reduced.

11. The plurality of power converters of claim 10, wherein each power converter includes a modulator which is independently operable to generate the independently controllable modulating sinusoidal voltage signal and the independent voltage carrier signal for its respective PWM strategy.

12. The plurality of power converters of claim 11, wherein each modulator is operable to generate the PWM command signal for the PWM strategy of each power converter by comparing each independent common voltage carrier signal with each respective independently controllable modulating sinusoidal voltage signal.

13. The plurality of power converters of claim 11, wherein the PWM strategy of each power converter is a three-phase PWM strategy and each modulator is operable to generate three of said independently controllable modulating sinusoidal voltage signals which are used to generate, in conjunction with the independent voltage carrier signal of each power converter, a PWM command signal for each respective phase, and further wherein each controller is selectively operable to provide each of said three generated independently controllable modulating sinusoidal voltage signals with the same dc voltage offset to simultaneously modify the PWM command signal of each respective phase.

14. The plurality of power converters of claim 10, wherein the or each controller is operable to determine the magnitude of the circulating current flowing between the plurality of power converters and to derive the magnitude of the required dc voltage offset from the determined magnitude of the circulating current.

15. The plurality of power converters of claim 14, wherein the or each controller is operable to measure the three-phase line currents on the output side of one or more of the plurality of power converters to thereby determine the magnitude of the circulating current.

16. The plurality of power converters of claim 15, wherein the or each controller is operable to determine the magnitude of the circulating current by summing the measured three-phase line currents on the output side of one or more of the plurality of power converters and by multiplying the summed three-phase line currents by one third.

17. The plurality of power converters of claim 14, wherein the or each controller includes a proportional-integral-derivative (PID) controller which is operable to determine the magnitude of the required dc voltage offset and in which the proportional and derivative terms are both preceded by a low pass filter (LPF).

18. The plurality of power converters of claim 17, wherein an error signal for input into the PID controller is based on the determined magnitude of the circulating current.

* * * * *